US011984074B2

United States Patent
Zhang

(12) United States Patent
(10) Patent No.: US 11,984,074 B2
(45) Date of Patent: May 14, 2024

(54) PIXEL DRIVING CIRCUIT, DISPLAY PANEL, AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Liuqi Zhang, Shenzhen (CN)

(73) Assignee: SHENZHEN CHINA STAR OPTOELECTRONICS SEMICONDUCTOR DISPLAY TECHNOLOGY CO., LTD, Shenzhen (CN)

( * ) Notice: Subject to any disclaimer, the term of this patent is extended or adjusted under 35 U.S.C. 154(b) by 417 days.

(21) Appl. No.: 17/298,649

(22) PCT Filed: Apr. 20, 2021

(86) PCT No.: PCT/CN2021/088341

§ 371 (c)(1),
(2) Date: May 31, 2021

(87) PCT Pub. No.: WO2022/205530

PCT Pub. Date: Oct. 6, 2022

(65) Prior Publication Data

US 2023/0351955 A1 Nov. 2, 2023

(30) Foreign Application Priority Data

Mar. 31, 2021 (CN) ......................... 202110347717.3

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0819* (2013.01);
(Continued)

(58) Field of Classification Search
CPC ............... G09G 3/3233; G09G 3/3291; G09G 2310/061; G09G 2320/0233; G09G 2300/0819
See application file for complete search history.

(56) References Cited

U.S. PATENT DOCUMENTS

2012/0200611 A1* 8/2012 Matsui ................ G09G 3/3233 345/77
2015/0154906 A1* 6/2015 Chung ................ G09G 3/3233 345/212

(Continued)

FOREIGN PATENT DOCUMENTS

CN 103150992 A 6/2013
CN 103489393 A 1/2014

(Continued)

*Primary Examiner* — Muhammad N Edun
(74) *Attorney, Agent, or Firm* — PV IP PC; Wei Te Chung; Zhigang Ma

(57) ABSTRACT

The present disclosure provides a pixel driving circuit, a display panel, and a display device. The pixel driving circuit includes a first reset transistor connected between a first reset voltage end and a gate electrode of a driving transistor, a first capacitor connected in series between the gate electrode of the driving transistor and one of a source electrode or a drain electrode of the driving transistor, and a second capacitor connected in series between the first capacitor and a second voltage end, thereby reducing an influence of a threshold voltage of the driving transistor on a driving current and ensuring light emission stability of light-emitting devices.

18 Claims, 7 Drawing Sheets

(52) U.S. Cl.
CPC ................ *G09G 2310/061* (2013.01); *G09G 2320/0233* (2013.01)

(56) References Cited

U.S. PATENT DOCUMENTS

2017/0213506 A1* 7/2017 Shibusawa ........... G09G 3/3266
2018/0053470 A1* 2/2018 Morita ................ G09G 3/3233

FOREIGN PATENT DOCUMENTS

| | | | |
|---|---|---|---|
| CN | 104050917 | A | 9/2014 |
| CN | 104599637 | A | 5/2015 |
| CN | 104680980 | A | 6/2015 |
| CN | 104700783 | A | 6/2015 |
| CN | 104778925 | A | 7/2015 |
| CN | 105096819 | A | 11/2015 |
| CN | 105427803 | A | 3/2016 |
| CN | 105957474 | A | 9/2016 |
| CN | 108091303 | A | 5/2018 |
| CN | 110544459 | A | 12/2019 |
| CN | 111489682 | A | 8/2020 |
| CN | 111951726 | A | 11/2020 |
| CN | 112071275 | A | 12/2020 |
| KR | 20200048652 | A | 5/2020 |
| TW | 201218165 | A | 5/2012 |
| TW | 201351378 | A | 12/2013 |

* cited by examiner

PIXEL DRIVING CIRCUIT, DISPLAY PANEL, AND DISPLAY DEVICE

RELATED APPLICATIONS

This application is a Notional Phase of PCT Patent Application No. PCT/CN2021/088341 having international filing date of Apr. 20, 2021, which claims the benefit of priority of Chinese Patent Application No. 202110347717.3 filed on Mar. 31, 2021. The contents of the above applications are all incorporated by reference as if fully set forth herein in their entirety.

BACKGROUND

Field of Invention

The present application relates to the field of display technology and particularly to a pixel driving circuit, a display panel, and a display device.

Description of Prior Art

A driving current of a pixel driving circuit for driving a light-emitting device to emit light is affected by a threshold voltage, which causes the light-emitting device to have a brightness unevenness problem and affects display quality of a display panel.

SUMMARY

The present disclosure provides a pixel driving circuit, a display panel, and a display device to reduce an influence of a threshold voltage of a driving transistor on a driving current.

The present disclosure provides a pixel driving circuit, including: a light-emitting device; a driving transistor, disposed in series with the light-emitting device between a first voltage end and a second voltage end; a first reset transistor, connected between a first reset voltage end and a gate electrode of the driving transistor; a first capacitor, wherein a first end of the first capacitor is connected to the gate electrode of the driving transistor, and a second end of the first capacitor is connected to one of a source electrode or a drain electrode of the driving transistor; and a second capacitor, wherein a first end of the second capacitor is connected to the second end of the first capacitor, and a second end of the second capacitor is connected to the second voltage end.

The present disclosure further provides a display panel, including a plurality of light-emitting devices and a plurality of pixel driving circuits; wherein each of the plurality of pixel driving circuits is configured to drive a corresponding one of the plurality of light-emitting devices to emit light; wherein each of the plurality of pixel driving circuits includes a first transistor, and a reset compensation module, and the reset compensation module comprises a second transistor, a first capacitor, and a second capacitor; wherein the second transistor is configured to load a first reset voltage signal to a gate electrode of a driving transistor according to a reset control signal, the first capacitor is configured to store a threshold voltage of the driving transistor, and the second capacitor is configured to couple the threshold voltage to the first capacitor.

An embodiment of the present disclosure further provides a display device, and the display device includes any one of the above-mentioned pixel driving circuits or any one of the above-mentioned display panels.

Compared with an existing technology, in the pixel driving circuit, the display panel, and the display device provided by an embodiment of the present disclosure, the pixel driving circuit includes a light-emitting device, a driving transistor, a first reset transistor, a first capacitor, and a second capacitor. The driving transistor is disposed in series with the light-emitting device between a first voltage end and a second voltage end. The first reset transistor is connected between a first reset voltage end and a gate electrode of the driving transistor. A first end of the first capacitor is connected to the gate electrode of the driving transistor, and a second end of the first capacitor is connected to one of a source electrode or a drain electrode of the driving transistor. A first end of the second capacitor is connected the second end of the first capacitor, and a second end of the second capacitor is connected to the second voltage end. The pixel driving circuit can adopt the first voltage end, the second voltage end, and the first reset voltage end to couple the threshold voltage of the driving transistor to the first capacitor through the second capacitor. Therefore, reducing an influence of the threshold voltage of the driving transistor on a driving current of the driving transistor, and ensuring a stability of a light emission of the light-emitting device, when the driving transistor drives the light-emitting device to emit light.

DETAILED DESCRIPTION OF EMBODIMENTS

In order to make purposes, technical solutions, and effects of the disclosure clearer, the present application will be further described in detail with reference to accompanying drawings and examples. It should be understood that specific embodiments described here are only used to explain the present disclosure, and are not used to limit the present disclosure.

FIG. 1A to FIG. 1F are structural schematic diagrams of a pixel driving circuit according to an embodiment of the present disclosure. The present disclosure provides a pixel driving circuit, and the pixel driving circuit includes a light-emitting device D1, a driving transistor Td, a first reset transistor Ts1, a first capacitor C1, and a second capacitor C2.

Optionally, the light-emitting device D1 includes an organic light-emitting diode, a sub-millimeter light-emitting diode, or a micro light-emitting diode.

Figure 1A:
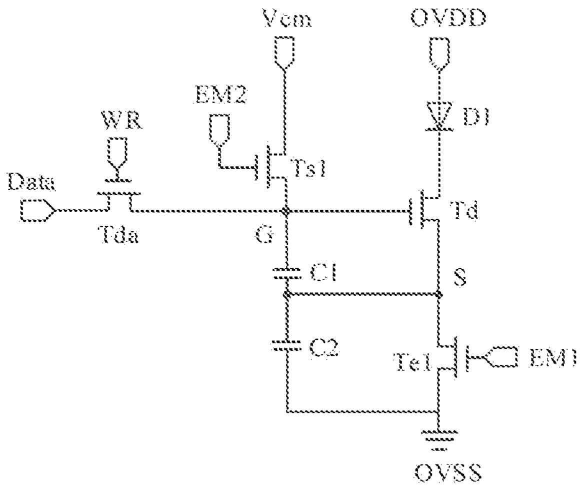
FIG. 1A to FIG. 1F are structural schematic diagrams of pixel driving circuits according to embodiments of the present disclosure.
Figure 1B:
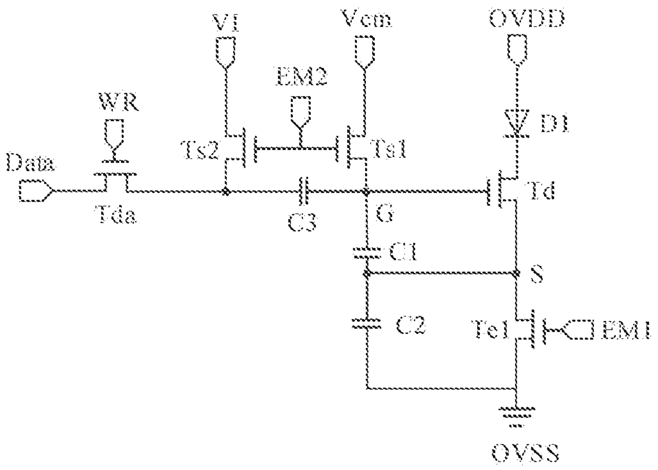
Figure 1C:
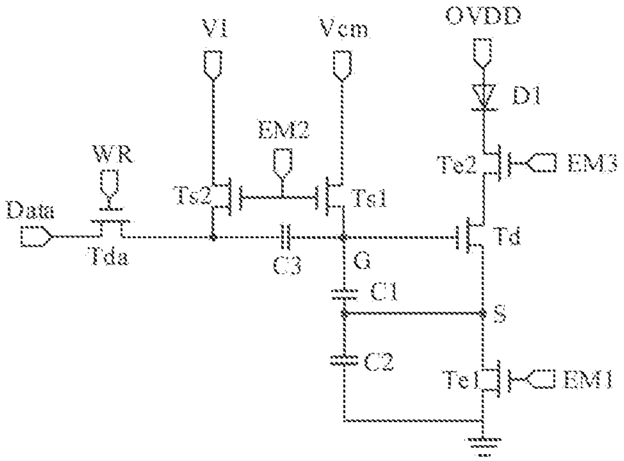

Further, the light-emitting transistor includes an inverted organic light-emitting diode, and the inverted organic light-emitting diode is connected in series with a first voltage end OVDD and a drain electrode of the driving transistor Td, as shown in FIG. 1A to FIG. 1C.

Figure 1D:
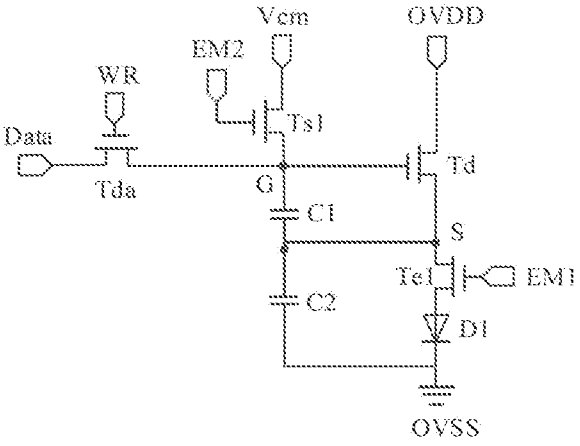
Figure 1E:
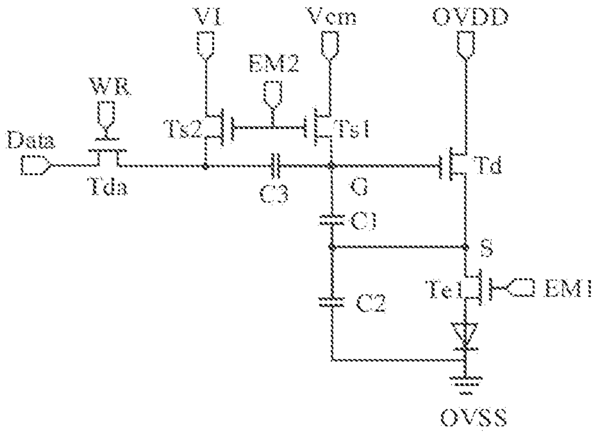
Figure 1F:
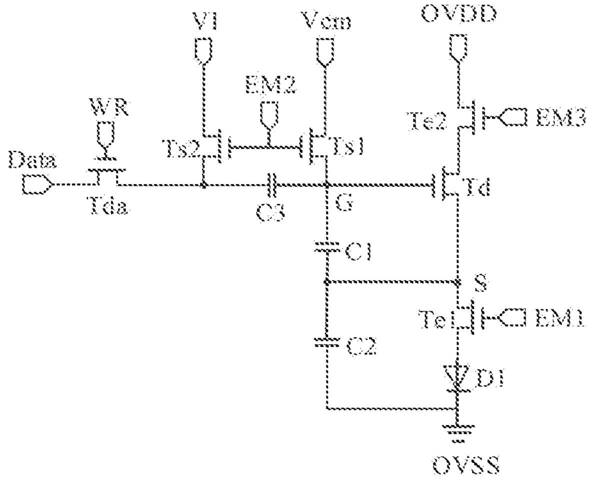

Further, the organic light-emitting diode includes a positive organic light-emitting diode, and the positive organic light-emitting diode is connected in series with a second voltage end OVSS and a source electrode of the driving transistor Td, as shown in FIG. 1D to FIG. 1F.

Please continue to refer to FIG. 1A to FIG. 1F, the driving transistor Td is disposed in series with the light-emitting device D1 between the first voltage end OVDD and the second voltage end OVSS. The driving transistor Td is configured to generate a driving current I to drive the light-emitting device D1 to emit light according to a data signal. A voltage value of a first voltage signal loaded by the first voltage end OVDD is greater than a voltage value of a second voltage signal loaded by the second voltage end OVSS.

Optionally, the driving transistor Td includes a field effect transistor. Further, the field effect transistor includes a thin-film transistor. Optionally, the driving transistor Td includes an inorganic semiconductor layer or an organic semiconductor. Further, the inorganic semiconductor layer includes materials such as an amorphous silicon semiconductor, a polysilicon semiconductor, and an oxide semiconductor. Optionally, the driving transistor Td includes N-type transistor or P-type transistor.

The first reset transistor Ts1 is connected between a first reset voltage end VI1 and the gate electrode of the driving transistor Td to reset a gate voltage Vg of the driving transistor by the first reset transistor Ts1. Wherein, the voltage value of the first voltage signal loaded by the first voltage end OVDD is greater than a voltage value of a first reset voltage signal Vcm loaded by the first reset voltage end VI1. A voltage value of the first reset voltage signal Vcm loaded to the first reset voltage end VI1 is greater than a threshold voltage Vth of the driving transistor Td.

Specifically, a gate electrode of the first reset transistor Ts1 is connected to a reset control signal line EM2. One of a source electrode or a drain electrode of the first reset transistor Ts1 is connected to the first reset voltage end VI1, and another of the source electrode or the drain electrode of the first reset transistor Ts1 is connected to the gate electrode of the driving transistor Td. Wherein, the reset control signal line EM2 is configured to provide a reset control signal em2 to the first reset transistor Ts1.

The first capacitor C1 is connected in series between the gate electrode of the driving transistor Td and one of the source electrode or the drain electrode of the driving transistor Td, and the first capacitor C1 is configured to store a threshold voltage Vth of the driving transistor Td.

Specifically, a first end of the first capacitor C1 is connected to the gate electrode of the driving transistor Td, and a second end of the first capacitor C1 is connected to the source electrode of the driving transistor Td.

The second capacitor C2 is connected in series between the second voltage end OVSS and one of the source electrode or the drain electrode of the driving transistor Td connected to the first capacitor C1, and the second capacitor C2 is configured to couple the threshold voltage Vth of the driving transistor Td to the first capacitor C1.

Specifically, a first end of the second capacitor C2 is connected to the second end of the first capacitor C1, and a second end of the second capacitor C2 is connected to the second voltage end OVSS.

In the pixel driving circuit, the first reset voltage signal Vcm loaded by the first reset voltage end VI1 is transmitted to the gate electrode of the driving transistor Td through the first reset transistor Ts1 to reset the gate voltage Vg of the driving transistor Td. By adopting the first reset voltage end VI1, the first voltage end OVDD, and the second voltage end OVSS, the threshold voltage Vth of the driving transistor Td is coupled to the first capacitor C1 through the second capacitor C2 to reduce an influence of the threshold voltage Vth on a driving current I and to ensure a light-emitting stability of the light-emitting device D1, when the driving transistor Td generates the driving current I for driving the light-emitting device D1 to emit light according to the data signal Vdata.

Please continue refer to FIG. 1A to FIG. 1F, the pixel driving circuit further includes a data transistor Tda. The data transistor Tda is connected between a data voltage end Data and the gate electrode of the driving transistor Td. The data transistor Tda is configured to transmit the data signal Vdata to the gate electrode of the driving transistor Td.

Specifically, the gate electrode of the data transistor Tda is connected to a data writing control signal line WR. One of a source electrode or a drain electrode of the data transistor Tda is connected to the data voltage end Data, and another of the source electrode or the drain electrode of the data transistor Tda is connected to the gate electrode of the driving transistor Td. Wherein, the data writing control signal line WR is configured to provide a data writing control signal wr to the data transistor Tda.

Optionally, another of the source electrode or the drain electrode of the data transistor Tda is directly connected to the gate electrode of the driving transistor Td, as shown in FIG. 1A and FIG. 1D.

Optionally, another of the source electrode or the drain electrode of the data transistor Tda is indirectly connected to the gate electrode of the driving transistor Td, as shown in FIG. 1B to FIG. 1C, and FIG. 1E to FIG. 1F. Specifically, the pixel driving circuit further includes a third capacitor C3, and the third capacitor C3 is connected in series between another of the source electrode or the drain electrode of the data transistor Tda and the drain electrode of the driving transistor Tda, to couple the data signal Vdata to the gate electrode of the driving transistor Td. i.e., a first end of the capacitor C3 is connected to the gate electrode of the driving transistor Td, and a second end of the third capacitor C3 is connected to another of the source electrode or the drain electrode of the data transistor Tda.

Further, the pixel driving circuit further includes a second reset transistor Ts2, and the second reset transistor Ts2 is connected between a second reset voltage end VI2 and the second end of the third capacitor C3 to reset a voltage across the third capacitor C3 with the first reset transistor Ts1.

Specifically, a gate electrode of the second reset transistor Ts2 is connected to the reset control signal line EM2. One of a source electrode or a drain electrode of the second reset transistor Ts2 is connected to the second reset voltage end VI2, and another of the source electrode or the drain electrode of the second reset transistor Ts2 is connected to the second end of the third capacitor C3. Wherein, the reset control signal line EM2 is configured to provide the reset control signal em2 to the first reset transistor Ts1 and the second reset transistor Ts2. The voltage value of the first voltage signal loaded by the first voltage end OVDD is greater than a voltage value of the second reset voltage signal Vi loaded by the second reset voltage end VI2.

Please continue to refer to FIG. 1A to FIG. 1F, the pixel driving circuit further includes a first switching transistor Te1. The first switching transistor Te1 is connected between the second voltage end OVSS and one of the source electrode or the drain electrode of the driving transistor Td connected to the second end of the first capacitor C1. The first switching transistor Te1 is configured to disconnect an electrical connection between the driving transistor Td and the second voltage end OVSS when the second capacitor C2 couples the threshold voltage Vth of the driving transistor Td to the first capacitor C1.

Specifically, a gate electrode of the first switching transistor Te1 is connected to a first light-emitting control signal line EM1. One of a source electrode or a drain electrode of the first switching transistor Te1 is connected to the source electrode of the driving transistor Td, the second end of the first capacitor C1, and the first end of the second capacitor C2, and another of the source electrode or the drain electrode of the first switching transistor Te1 is connected to the second voltage end OVSS and the second end of the second capacitor C2. Wherein, the first light-emitting control signal line EM1 is configured to provide a first light-emitting control signal em1 to the first switching transistor Te1.

Optionally, another of the source electrode or the drain electrode of the first switching transistor Te1 is directly connected to the second voltage end OVSS and the second end of the second capacitor C2, as shown in FIG. 1A to FIG. 1C.

Optionally, another of the source electrode or the drain electrode of the first switching transistor Te1 is indirectly connected to the second voltage end OVSS and the second end of the second capacitor C2, as shown in FIG. 1D to FIG. 1F. Specifically, another of the source electrode of the drain electrode of the first switching transistor Te1 is connected to an anode of the light-emitting device D1, and a cathode of the light-emitting device D1 is directly connected to the second voltage end OVSS and the second end of the second capacitor C2.

Please continue to refer to FIG. 1C and FIG. 1F, the pixel driving circuit further includes a second switching transistor Te2, and the second switching transistor Te2 is connected between another of the source electrode or the drain electrode of the driving transistor Td and the first voltage end OVDD. The second switching transistor Te2 is configured to disconnect an electrical connection between the first voltage end OVDD and the driving transistor Td to reduce an influence of the first voltage end OVDD on a voltage stored in the first capacitor C1 when the data signal Vdata is transmitted to the gate electrode of the driving transistor Td.

Specifically, a gate electrode of the second switching transistor Te2 is connected to a second light-emitting control signal line EM3. One of a source electrode or a drain electrode of the second switching transistor Te2 is connected to the drain electrode of the driving transistor Td, and another of the source electrode or the drain electrode of the second switching transistor Te2 is connected to the first voltage end OVDD. Wherein, the second light-emitting control signal line EM3 is configured to provide a second light-emitting control signal em3 to the second switching transistor Te2.

Optionally, another of the source electrode or the drain electrode of the second switching transistor Te2 is indirectly connected to the first voltage end OVDD, as shown in FIG. 1C. Specifically, the anode of the light-emitting device D1 is connected to the first voltage end OVDD. Another of the source electrode or the drain electrode of the second switching transistor Te2 is connected to the cathode of the light-emitting device D1.

Optionally, the source electrode or the drain electrode of the second switching transistor Te2 is directly connected to the first voltage end OVDD, as shown in FIG. 1F.

Optionally, the first reset transistor Ts1, the second reset transistor Ts2, the data transistor Tda, the first switching transistor Te1, and the second switching transistor Te2 include the field effect transistor. Further, the field effect transistor includes the thin-film transistor. Optionally, the first reset transistor Ts1, the second reset transistor Ts2, the data transistor Tda, the first switching transistor Te1, and the second switching transistor Te2 are N-type transistors or P-type transistors.

Optionally, the pixel driving circuit can simultaneously drive a plurality of light-emitting devices D1 to emit light. Specifically, the plurality of light-emitting devices D1 are connected in parallel and connected in series with the driving transistor Td between the first voltage end OVDD and the second end OVSS.

Figure 2A:
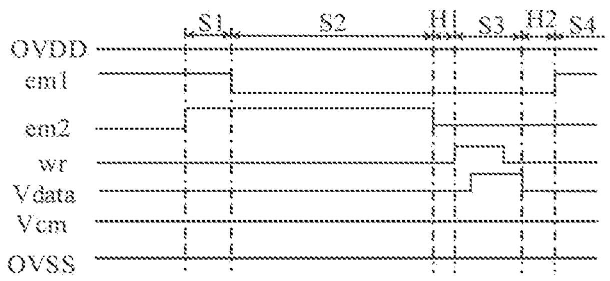
FIG. 2A is a working sequence diagram of the pixel driving circuits shown in FIG. 1A and FIG. 1D according to the embodiments of the present disclosure.
Figure 2B:
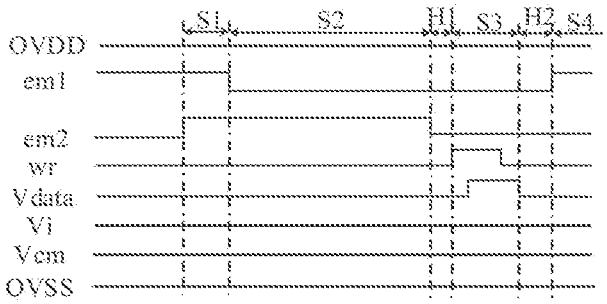
FIG. 2B is a working sequence diagram of the pixel driving circuits shown in FIG. 1B and FIG. 1E according to the embodiments of the present disclosure.
Figure 2C:
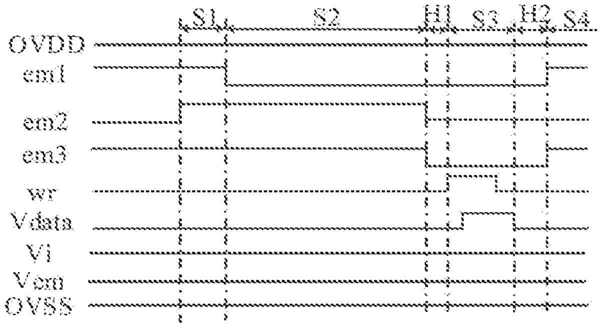
FIG. 2C is a working sequence diagram of the pixel driving circuits shown in FIG. 1C and FIG. 1F according to the embodiments of the present disclosure.

FIG. 2A is a working sequence diagram of the pixel driving circuit shown in FIG. 1A and FIG. 1D. FIG. 2B is a working sequence diagram of the pixel driving circuit shown in FIG. 1B and FIG. 1E. FIG. 2C is a working sequence diagram of the pixel driving circuit shown in FIG. 1C and FIG. 1F. The present disclosure further provides a driving method of the pixel driving circuit to drive any of the above-mentioned pixel driving circuits.

Specifically, the driving method of the pixel driving circuit includes a reset stage S1, a detection stage S2, a data writing stage S3, and a light-emitting stage S4.

In the reset stage S1, the first reset voltage signal Vcm loaded by the first reset voltage VI1 is applied to the gate electrode of the driving transistor Td by the first reset transistor Ts1, and the gate voltage of the driving transistor Td is reset.

In the detection stage S2, by adopting the first voltage end OVDD, the second voltage end OVSS, and the first reset voltage end VI1, the threshold voltage Vth of the driving transistor Td is coupled to the first capacitor C1 by the second capacitor C2.

In the data writing stage S3, the data signal Vdata loaded by the data voltage end Data is loaded to the gate electrode of the driving transistor Td by the data transistor Tda. Optionally, the data signal Vdata is coupled to the gate electrode of the driving transistor Td by the third capacitor C3.

In the light-emitting stage S4, the driving current I generated by the driving transistor Td is adopted to drive the light-emitting device D1 to emit light.

Optionally, a first maintaining stage H1 is included between the detection stage S2 and the data writing stage S3, and a second maintaining stage H2 is included between the data writing stage S3 and the light-emitting stage S4. Wherein, in the first maintaining stage H1, the gate voltage of the driving transistor Td is consistent with the gate voltage in the rest stage S1. In the second maintaining stage H2, the gate voltage of the driving transistor Td is consistent with the gate voltage in the data writing stage S3.

For example, the driving transistor Td, the first reset transistor Ts1, the second reset transistor Ts2, the first switching transistor Te1, the second switching transistor Te2, and the data transistor Tda are all N-type transistors, and the source electrode of the driving transistor Td is electrically connected to the second voltage end OVSS, and the drain electrode of the driving transistor Td is electrically connected to the first voltage end OVDD. A working principle of the pixel driving circuit shown in FIG. 1A to FIG. 1F is illustrated in combination with the driving method of the pixel driving circuit.

Specifically, please continue to refer to FIG. 1A, FIG. 1D, and FIG. 2A. In the reset stage S1, the first light-emitting control signal em1 loaded by the first light-emitting control signal line EM1 is at a high level, and the reset control signal em2 loaded by the reset control signal line EM2 is at a high level. The first reset transistor Ts1 is turned on in response to the reset control signal em2, and the first switching transistor Te1 is turned on in response to the first light-emitting control signal em1. The first reset voltage signal Vcm loaded by the voltage end VI1 resets a potential at a first node G by the first reset transistor Ts1, so that the gate voltage Vg of the driving transistor Td is reset. Since the voltage value of the first reset voltage signal Vcm is greater than the threshold voltage Vth of the driving transistor Td, and the first switching transistor Te1 is turned on, the gate-source voltage Vgs of the driving transistor Td is greater than the threshold voltage Vth of the driving transistor Td. The driving transistor Td is turned on, and the light-emitting device D1 emits light due to the driving transistor Td and the first switching transistor Te1 turning on. Wherein, a second node S corresponds to the source electrode of the driving transistor Td and the second end of the first capacitor C1.

In the detection stage S2, the first light-emitting control signal em1 loaded by the first light-emitting control signal line EM1 is at a low level, and the reset control signal em2 loaded by the reset control signal line EM2 is at a high level. The first reset transistor Ts1 remains on, and the first switching transistor Te1 is off. Due to existence of the first capacitor C1, the driving transistor Td remains on. The first reset transistor Ts1 remains on so that the gate voltage Vg of the driving transistor Td is still Vcm (i.e., Vg=Vcm). The driving transistor Td is turned on and the first switching transistor Te1 is turned off, so that two ends of the capacitor C2 are electrically connected to the first voltage end OVDD and the second voltage end OVSS, respectively. The second capacitor C2 is charged to increase a potential of the source electrode of the driving transistor Td, until a source voltage Vs of the driving transistor Td is equal to Vcm-Vth (i.e., Vs=Vcm−Vth). The gate-source voltage Vgs of the driving transistor Td is equal to the threshold voltage Vth of the driving transistor Td (i.e., Vg−Vs=Vcm−Vcm+Vth=Vth). The driving transistor Td is turned off, and the threshold voltage Vth of the driving transistor Td is stored in the first capacitor C1.

In the first maintaining stage H1, the first light-emitting control signal em1, the reset control signal em2, and the data writing control signal wr are all at a low level. The driving transistor Td, the first reset transistor Ts1, the first switching transistor Te1, and the data transistor Tda are all turned off, and the gate-source voltage Vgs of the driving transistor Td is maintained at the threshold voltage Vth.

In the data writing stage S3, the data writing control signal wr loaded by the data writing control signal line WR is at a high level, and the data transistor Tda is on in response to the data writing control signal wr. The data signal Vdata is transmitted to the gate electrode of the driving transistor Td. The gate voltage Vg of the driving transistor Td changes from Vcm to Vdata, and a variation is Vdata−Vcm. Correspondingly, due to existence of the first capacitor C1 and the second capacitor C2, the variation Vdata−Vcm is divided by the first capacitor C1 and the second capacitor C2 to make a potential change of the second node S, i.e., to make the source voltage Vs of the driving transistor Td change from Vcm−Vth to Vcm−Vth+(Vdata−Vcm)*(C1/(C1+C2)).

In the second maintaining stage H2, the first light-emitting control signal em1, the reset control signal em2, and the data writing control signal wr are all at a low level. The driving transistor Td, the first reset transistor Ts1, the first switching transistor Te1, and the data transistor Tda are all turned off. The gate voltage Vg of the driving transistor Td is maintained at Vdata, and the source voltage Vs of the driving transistor Td is maintained as Vcm−Vth+(Vdata−Vcm)*(C1/(C1+C2)).

In the light-emitting stage S4, the first light-emitting control signal em1 is at a high level. The first switching transistor Te1 is turned on, and the driving transistor Td generates the driving current I for driving the light-emitting device D1 to emit light.

Wherein, since Vg=Vdata, Vs=Vcm−Vth+(Vdata−Vcm)*(C1/(C1+C2)), and $I=(C_{ox}\mu_m W/L)*(Vgs-Vth)^2/2$; $C_{ox}$, $\mu_m$, W, and L respectively represent a channel capacitance per unit area, a channel mobility, a channel width, and a channel length of the transistor, then $$Vgs=Vg-Vs=V\text{data}-Vcm+Vth-(V\text{data}-Vcm)*(C1/(C1+C2))$$

$$I=(C_{ox}\mu_m W/L)*(V\text{data}-Vcm-(V\text{data}-Vcm)*(C1/(C1+C2)))^2/2$$

Therefore, when the driving transistor Td drives the light-emitting device D1 to emit light, an influence of the threshold voltage Vth of the driving transistor Td on the driving current I can be reduced to ensure a stability of the light-emitting device D1.

Specifically, please continue to refer to FIG. 1B, FIG. 1E, and FIG. 2B. In the reset stage S1, the first light-emitting control signal em1 loaded by the first light-emitting control signal line EM1 is at a high level, and the reset control signal em2 loaded by the reset control signal line EM2 is at a high level. The first reset transistor Ts1 and the second reset transistor Ts2 are turned on in response to the reset control signal em2, and the first switching transistor Te1 is turned on in response to the first light-emitting control signal em1. The second reset voltage signal Vi loaded by the second reset voltage end VI2 resets a potential at the third node M through the second reset transistor Ts2, and the first reset voltage signal Vcm loaded by the first reset voltage end VI1 resets a potential at the first node G through the first reset transistor Ts1, so that the gate voltage Vg of the driving transistor Td is reset. Since a voltage value of the first reset voltage signal Vcm is greater than the threshold voltage Vth of the driving transistor Td, and the first switching transistor Te1 is turned on, the gate-source voltage Vgs of the driving transistor Td is greater than the threshold voltage Vth of the driving transistor, the driving transistor Td is turned on, and the light-emitting device D1 emits light due to the driving transistor Td and the first switching transistor Te1 turning on. Wherein, a third node M corresponds to the second end of the third capacitor C3.

In the detection stage S2, the first light-emitting control signal em1 loaded by the first light-emitting control signal line EM1 is at a low level, and the reset control signal em2 loaded by the reset control signal line EM2 is at a high level. The first reset transistor Ts1 and the second reset transistor Ts2 remain on, and the first switching transistor Te1 is off. Voltages of two ends of the third capacitor C3 are still maintained as Vi and Vcm, and due to the existence of the first capacitor C1, the driving transistor Td remains on. The first reset transistor Ts1 remains on so that the gate voltage Vg of the driving transistor Td is still Vcm (i.e., Vg=Vcm). The driving transistor Td is turned on and the first switching transistor Te1 is turned off, so that two ends of the capacitor C2 are electrically connected to the first voltage end OVDD and the second voltage end OVSS, respectively. The second capacitor C2 is charged to increase a potential of the source electrode of the driving transistor Td, until a source voltage Vs of the driving transistor Td is equal to Vcm−Vth (i.e., Vs=Vcm−Vth), the gate-source voltage Vgs of the driving transistor Td is equal to the threshold voltage Vth of the driving transistor Td (i.e., Vg−Vs=Vcm-Vcm+Vth=Vth). The driving transistor Td is turned off, and the threshold voltage Vth of the driving transistor Td is stored in the first capacitor C1.

In the first maintaining stage H1, the first light-emitting control signal em1, the reset control signal em2, and the data writing control signal wr are all at a low level, the driving transistor Td, the first reset transistor Ts1, the second reset transistor Ts2, the first switching transistor Te1, and the data transistor Tda are all turned off, and the gate-source voltage Vgs of the driving transistor Td is maintained at the threshold voltage Vth.

In the data writing stage S3, the data writing control signal wr loaded by the data writing control signal line WR is at a high level, and the data transistor Tda is on in response to the data writing control signal wr. The data signal Vdata is transmitted to the third node M, and a voltage at the third node M changes from Vi to Vdata, and a variation is Vdata-Vi. Due to existence of the third capacitor C3, the voltage at the first node G (i.e., the gate voltage Vg of the driving transistor Td) also has the variation Vdata-Vi, and due to the existence of the first capacitor C1 and the second capacitor C2, the variation Vdata-Vi is divided by the first capacitor C1, the second capacitor C2, and the third capacitor C3 to change the gate voltage Vg of the driving transistor Td from Vcm to Vcm+(Vdata−Vi)*(C3/((C1C2/(C1+C2))+C3)). Correspondingly, due to a variation (Vdata−Vi)*(C3/((C1C2/(C1+C2))+C3)) at the first node G, the first capacitor C1 and the second capacitor C2 have a voltage dividing function, so that the source voltage Vs of the driving transistor Td is changed from Vcm−Vth to Vcm−Vth+(Vdata−Vi)*(C3/((C1C2/(C1+C2))+C3))*(C1/(C1+C2)), i.e., Vs=Vcm−Vth+(Vdata−Vi)*(C3C1/(C1C2+C1C3+C2C3)).

In the second sustaining stage H2, the first light-emitting control signal em1, the reset control signal em2, and the data writing control signal wr are all at a low level. The driving transistor Td, the first reset transistor Ts1, the second reset transistor Ts2, the first switching transistor Te1, and the data transistor Tda are all turned off. The gate voltage Vg of the driving transistor Td is maintained at Vcm+(Vdata-Vi)*(C3/((C1C2/(C1+C2))+C3)), and the source voltage Vs of the driving transistor Td is maintained as Vcm−Vth+(Vdata−Vi)*(C3C1/(C1C2+C1C3+C2C3)).

In the light-emitting stage S4, the first light-emitting control signal em1 is at a high level. The first switching transistor Te1 is turned on, and the driving transistor Td generates the driving current I for driving the light-emitting device D1 to emit light.

Wherein, since Vg=Vcm+(Vdata−Vi)*(C3/((C1C2/(C1+C2))+C3)), Vs=Vcm−Vth+(Vdata−Vi)*(C3C1/(C1C2+C1C3+C2C3)), then $$Vgs=Vth+(V\text{data}-Vi)*[(C3/((C1C2/(C1+C2))+C3))-(C3C1/(C1C2+C1C3+C2C3))]$$

$$I=(C_{ox}\mu_m W/L)*(Vgs-Vth)^2/2=(C_{ox}\mu_m W/L)*[(V\text{data}-Vi)*((C3/((C1C2/(C1+C2))+C3))-(C3C1/(C1C2+C1C3+C2C3)))]^2/2$$

Therefore, when the driving transistor Td drives the light-emitting device D1 to emit light, the influence of the threshold voltage Vth of the driving transistor Td on the driving current I can be reduced to ensure stability of the light-emitting device D1.

Specifically, please continue to refer to FIG. 1C, FIG. 1F, and FIG. 2C. In the reset stage S1, the first light-emitting control signal em1 loaded by the first light-emitting control signal line EM1 is at a high level, and the second light-emitting control signal em3 loaded by the second light-emitting control signal line EM3 is at a high level. The first reset transistor Ts1 and the second reset transistor Ts2 are turned on in response to the reset control signal em2. The first switching transistor Te1 is turned on in response to the first light-emitting control signal em1. The second switching transistor Te2 is turned on in response to the second light-emitting control signal em3. The second reset voltage signal Vi loaded by the second reset voltage end VI2 resets a potential at the third node M through the second reset transistor Ts2, and the first reset voltage signal Vcm loaded by the first reset voltage end VI1 resets a potential at the first node G through the first reset transistor Ts1, so that the gate voltage Vg of the driving transistor Td is reset. Since the voltage value of the first reset voltage signal Vcm is greater than the threshold voltage Vth of the driving transistor Td, and the first switching transistor Te1 is turned on, the gate-source voltage Vgs of the driving transistor Td is greater than the threshold voltage Vth of the driving transistor, the driving transistor Td is turned on, and the light-emitting device D1 emits light due to the driving transistor Td and the first switching transistor Te1 turning on.

In the detection stage S2, the first light-emitting control signal em1 loaded by the first light-emitting control signal line EM1 is at a low level, the reset control signal em2 loaded by the reset control signal line EM2 is at a high level, and the second light-emitting control signal em3 loaded by the second light-emitting control signal line EM3 is at a high level. The first reset transistor Ts1 and the second reset transistor Ts2 remain on, the first switching transistor Te1 is off, and the second switching transistor Ts2 is on. Voltages of two ends of the third capacitor C3 are still maintained as Vi and Vcm, and due to the existence of the first capacitor C1, the driving transistor Td remains on. The first reset transistor Ts1 remains on so that the gate voltage Vg of the driving transistor Td is still Vcm (i.e., Vg=Vcm). The driving transistor Td is turned on and the first switching transistor Te1 is turned off, so that two ends of the capacitor C2 are electrically connected to the first voltage end OVDD and the second voltage end OVSS, respectively. The second capacitor C2 is charged to increase a potential of the source electrode of the driving transistor Td, until a source voltage Vs of the driving transistor Td is equal to Vcm−Vth (i.e., Vs=Vcm−Vth), the gate-source voltage Vgs of the driving transistor Td is equal to the threshold voltage Vth of the driving transistor Td (i.e., Vg-Vs=Vcm−Vcm+Vth=Vth), the driving transistor Td is turned off, and the threshold voltage Vth of the driving transistor Td is stored in the first capacitor C1.

In the first maintaining stage H1, the first light-emitting control signal em1, the reset control signal em2, the third light-emitting control signal em3, and the data writing control signal wr are all at a low level, the driving transistor Td, the first reset transistor Ts1, the second reset transistor Ts2, the first switching transistor Te1, and the data transistor Tda are all turned off, and the gate-source voltage Vgs of the driving transistor Td is maintained at the threshold voltage Vth.

In the data writing stage S3, the data writing control signal wr loaded by the data writing control signal line WR is at a high level, and the data transistor Tda is on in response to the data writing control signal wr. The data signal Vdata is transmitted to the third node M, a voltage at the third node M changes from Vi to Vdata, and a variation is Vdata−Vi. Due to the existence of the third capacitor C3, the voltage at the first node G (i.e., the gate voltage Vg of the driving transistor Td) also has the variation Vdata−Vi, and due to the existence of the first capacitor C1 and the second capacitor C2, the variation Vdata−Vi is divided by the first capacitor C1, the second capacitor C2, and the third capacitor C3 to change the gate voltage Vg of the driving transistor Td from Vcm to Vcm+(Vdata−Vi)*(C3/((C1C2/(C1+C2))+C3)). Correspondingly, due to a variation (Vdata−Vi)*(C3/((C1C2/(C1+C2))+C3)) at the first node G, the first capacitor C1 and the second capacitor C2 have a voltage dividing function, so that the source voltage Vs of the driving transistor Td is changed from Vcm−Vth to Vcm−Vth+(Vdata−Vi)*(C3/((C1C2/(C1+C2))+C3))*(C1/(C1+C2)), i.e., Vs=Vcm−Vth+(Vdata−Vi)*(C3C1/(C1C2+C1C3+C2C3)).

Wherein, in the data writing stage S3, since the second light-emitting control signal em3 is at a low level and the second switch transistor Te2 is turned off, an electrical connection between the driving transistor Td and the first voltage end OVDD is disconnected, which can reduce an influence of the first voltage end OVDD on the source voltage Vs of the driving transistor Td, thereby reducing an influence on the voltage stored in the first capacitor C1, and then reducing an influence on the gate voltage Vg of the driving transistor Td.

In the second maintaining stage H2, the first light-emitting control signal em1, the reset control signal em2, and the data writing control signal wr are all at a low level. The driving transistor Td, the first reset transistor Ts1, the second reset transistor Ts2, the first switching transistor Te1, and the data transistor Tda are all turned off. The gate voltage Vg of the driving transistor Td is maintained at Vcm+(Vdata−Vi)*(C3/((C1C2/(C1+C2))+C3)), and the source voltage Vs of the driving transistor Td is maintained as Vcm−Vth+(Vdata−Vi)*(C3C1/(C1C2+C1C3+C2C3)).

In the light-emitting stage S4, the first light-emitting control signal em1 is at a high level, the first switching transistor Te1 is turned on, and the driving transistor Td generates the driving current I for driving the light-emitting device D1 to emit light.

Wherein, since Vg=Vcm+(Vdata−Vi)*(C3/((C1C2/(C1+C2))+C3)), Vs=Vcm−Vth+(Vdata−Vi)*(C3C1/(C1C2+C1C3+C2C3)), then $$Vgs=Vth+(V\text{data}-Vi)*[(C3/((C1C2/(C1+C2))+C3))-(C3C1/(C1C2+C1C3+C2C3))]$$

$$I=(C_{ox}\mu_m W/L)*(Vgs-Vth)^2/2=(C_{ox}\mu_m W/L)*[(V\text{data}-Vi)*((C3/((C1C2/(C1+C2))+C3))-(C3C1/(C1C2+C1C3+C2C3)))]^2/2$$

Therefore, when the driving transistor Td drives the light-emitting device D1 to emit light, the influence of the threshold voltage Vth of the driving transistor Td on the driving current I can be reduced to ensure the stability of the light-emitting device D1.

An embodiment of the present disclosure further provides a display panel, and the display panel includes any one of the above-mentioned pixel driving circuits.

Figure 3A:
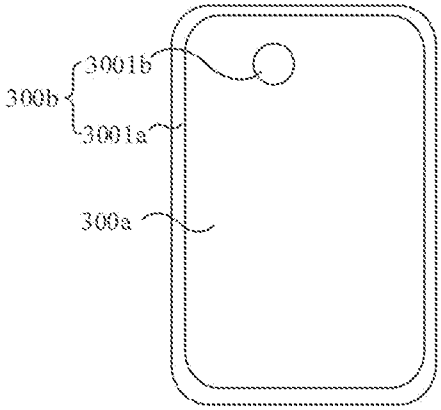
FIG. 3A to FIG. 3B are structural schematic diagrams of display panels according to the embodiments of the present disclosure.
Figure 3B:
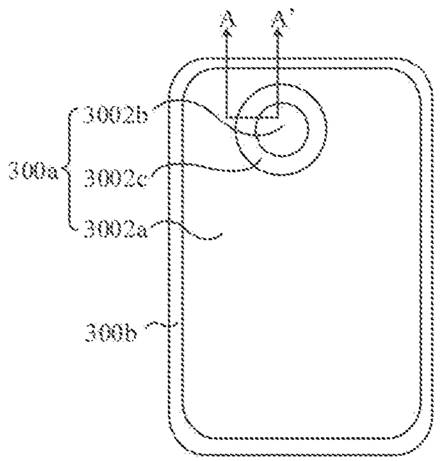
Figure 3C:
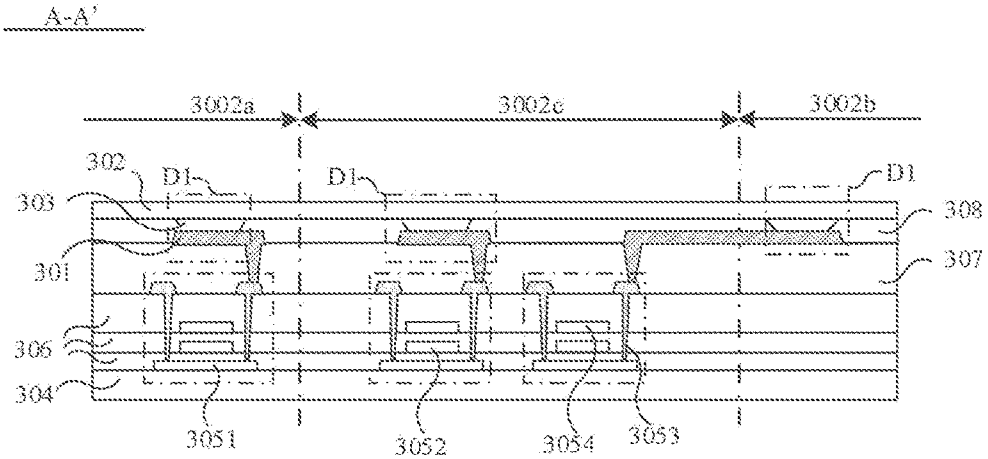
FIG. 3C to FIG. 3D are cross-sectional views along A-A' of FIG. 3B according to the embodiments of the present disclosure.
Figure 3D:
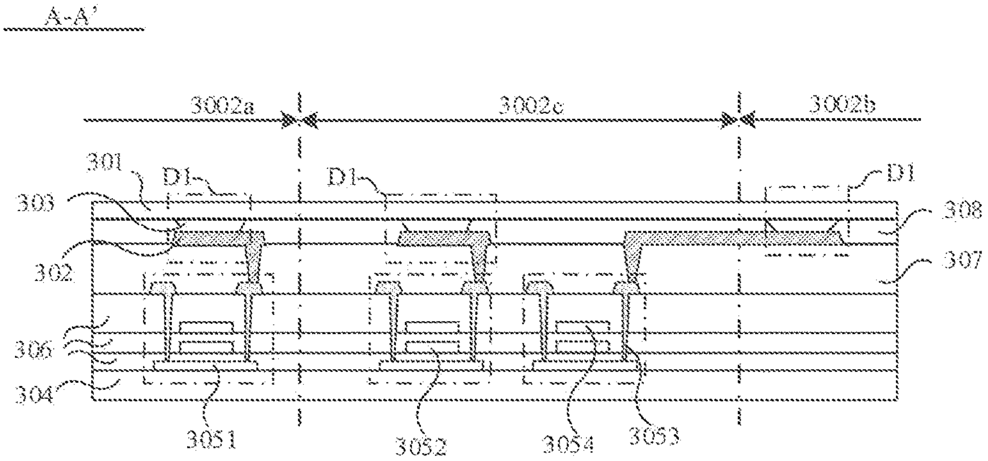

Please continue to refer to FIG. 3A to FIG. 3B, which are structural schematic diagrams of the display panel according to an embodiment of the present disclosure. FIG. 3C to FIG. 3D are cross-sectional views along A-A' of FIG. 3B. FIG. 4A to FIG. 4F are structural schematic diagrams of the pixel driving circuit according to an embodiment of the present disclosure. The embodiment of the present disclosure further provides the display panel. Optionally, the display panel includes a self-luminous display panel, a quantum dot display panel, a flexible display panel, etc.

Please continue to refer to FIG. 3A to FIG. 3B, the display panel includes a display area 300*a* and a non-display area 300*b*.

Optionally, the non-display area 300*b* includes a first non-display area 3001*a* disposed at a periphery of the display area 300*a*, and a second non-display area 3001*b* disposed in the display area 300*a*, as shown in FIG. 3A. Further, the display panel further includes a sensor disposed directly opposite to the second non-display area 3001*b*.

Optionally, the display area 300*a* includes a main display area 3002*a*, a light-transmitting display area 3002*b*, and a transition display area 3002*c* disposed between the main display area 3002*a* and the light-transmitting display area 3002*b*. The non-display area 300*b* is disposed outside the main display area 3002*a*, as shown in FIG. 3B. Further, the display panel further includes a sensor arranged directly opposite to the light-transmitting display area 3002*b*.

Optionally, the sensor includes a fingerprint recognition sensor, a camera, a structured light sensor, a light sensor, etc., so that the display panel collects signals through the sensor, and the display panel realizes under-screen sensing solutions such as an under-screen fingerprint recognition, an under-screen camera, under-screen recognition, and under-screen distance perception.

The display panel includes a plurality of light-emitting devices D1 and a plurality of pixel driving circuits, and the pixel driving circuit is connected to a corresponding light-emitting device D1 for driving the corresponding light-emitting device D1 to emit light.

Optionally, the pixel driving circuit is connected to the light-emitting device D1, so as to adopt the pixel driving circuit to drive the light-emitting device D1 to emit light. Specifically, as shown in FIG. 3A, in the display area 300*a*, the pixel driving circuit is adopted to drive the light-emitting device D1 to emit light. Specifically, as shown in FIG. 3B, in the main display area 3002*a*, the pixel driving circuit is adopted to drive the light-emitting device D1 to emit light.

Optionally, the pixel driving circuit is connected to the plurality of light-emitting devices D1, so as to adopt the pixel driving circuit to drive the plurality of light-emitting devices D1 to emit light. Specifically, as shown in FIG. 3B, in the light-transmitting display area 3002*b* and the transition display area 3002*c*, the pixel driving circuit is adopted to drive the plurality of light-emitting devices D1 to emit light. The pixel driving circuit driving the plurality of light-emitting devices D1 disposed in the light-transmitting area 3002*b* and the transition display area 3002*c* is disposed in the transition display area 3002*c*, so as to reduce an influence of the pixel driving circuit on a light transmittance of the light-transmitting display area 3002*b*.

Optionally, the light-emitting device D1 includes organic light-emitting diode, sub-millimeter light-emitting diode, or micro light-emitting diode. Further, the organic light-emitting diode includes inverted organic light-emitting diode and positive light-emitting diode.

Please continue to refer to FIG. 3C to FIG. 3D. Each of the light-emitting devices D1 includes a cathode 301, an anode 302, and a light-emitting layer 303 disposed between the cathode 301 and the anode 302. The display panel includes a substrate 304, and the light-emitting device D1 and the pixel driving circuit are both disposed on the substrate 304.

Further, the light-emitting device D1 is the inverted organic light-emitting diode. The cathode 301 of the light-emitting device D1 is connected to the pixel driving circuit, and the anode 302 of the light-emitting device D1 is disposed on a side of the light-emitting layer 303 away from the substrate 304, as shown in FIG. 3C, or the light-emitting device D1 is the positive organic light-emitting diode, and the anode 302 of the light-emitting device D1 is connected to the pixel driving circuit, and the cathode 301 of the light-emitting device D1 is disposed on a side of the light-emitting layer 303 away from the substrate 304, as shown in FIG. 3D.

Optionally, the light-emitting layer 303 includes quantum dot materials, perovskite materials, fluorescent materials, etc., to improve a luminous efficiency of the light-emitting device D1.

Please continue to refer to FIG. 3C to FIG. 3D, the display panel further includes an active layer 3051, a first electrode layer, a second electrode layer, an insulating layer 306, a flat layer 307, and a pixel definition layer 308. The first electrode layer includes a gate electrode 3052 corresponding to the active layer 3051, and the second electrode layer includes a source electrode and a drain electrode 3053 electrically connected to the active layer 3051. Wherein, the pixel driving circuit includes a plurality of transistors, and each of the transistors includes the active layer 3051, the gate electrode 3052, and the source electrode and the drain electrode 3053. Optionally, the display panel further includes a third electrode layer, and the third electrode layer includes an electrode portion 3054 corresponding to the gate electrode 3052, so that the electrode portion 3054 and the gate electrode 3052 form a capacitance.

Optionally, the active layer 3051 includes inorganic semiconductor material or organic semiconductor material. Further, the inorganic semiconductor material includes materials such as amorphous silicon semiconductor, polysilicon semiconductor, and oxide semiconductor.

Optionally, the display panel further includes an encapsulation layer, a touch electrode, a color conversion layer, and other parts that are not shown.

Please continue to refer to FIG. 4A to FIG. 4F. The pixel driving circuit includes a driving module, a reset compensation module, a data writing module, and a light-emitting control module.

Figure 4A:
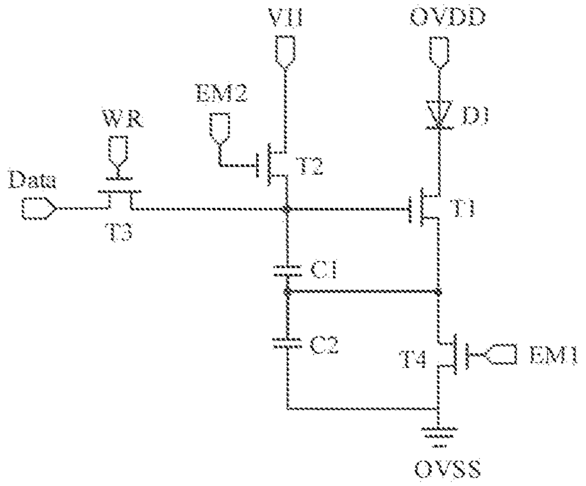
FIG. 4A to FIG. 4F are structural schematic diagrams of pixel driving circuits according to the embodiments of the present disclosure.
Figure 4B:
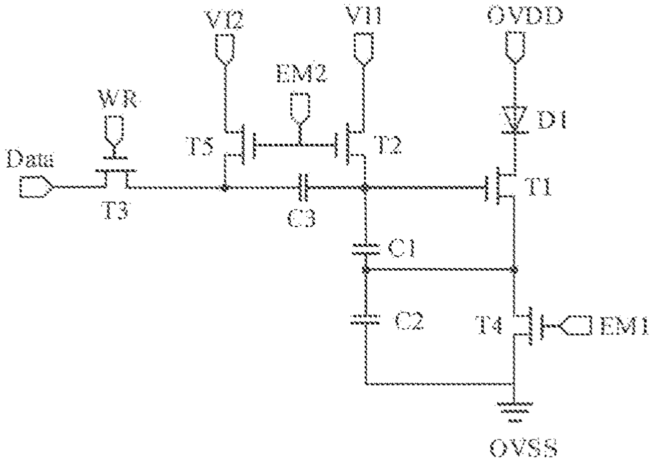
Figure 4C:
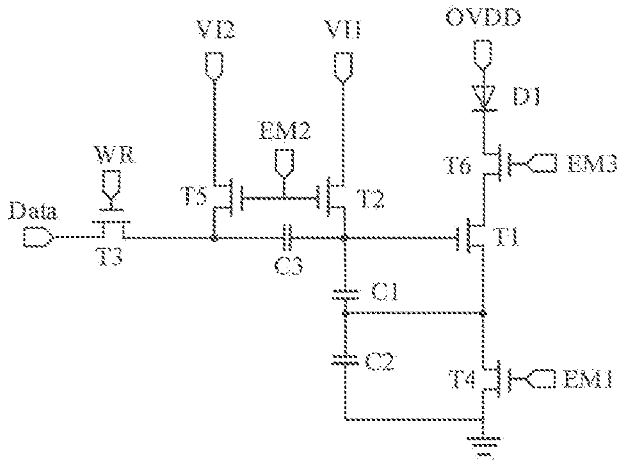
Figure 4D:
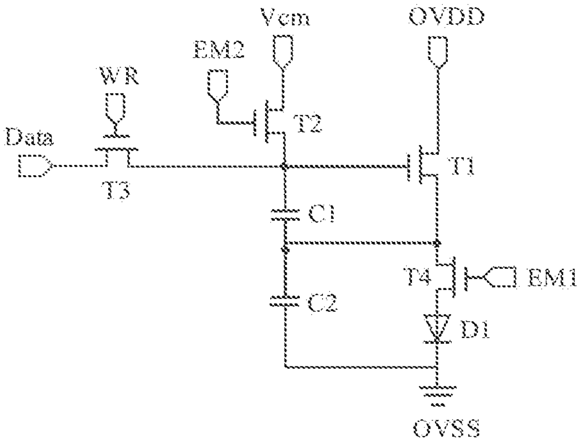
Figure 4E:
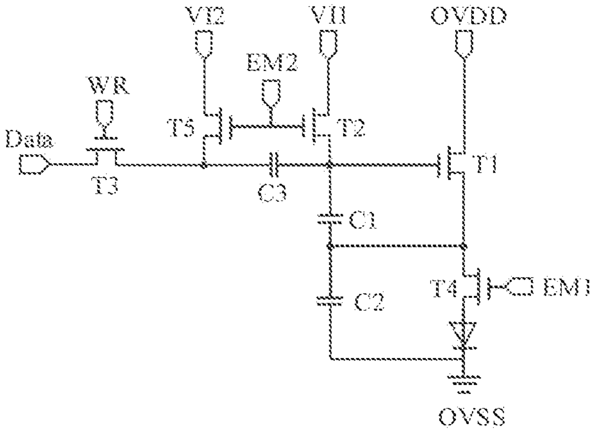
Figure 4F:
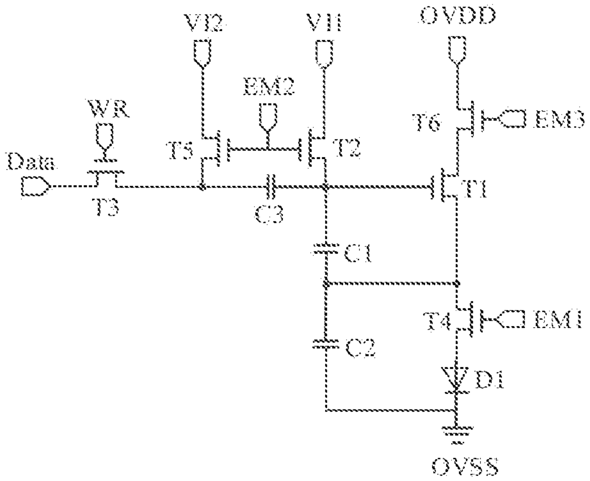

The driving module includes a first transistor T1. The first transistor T1 is adopted to generate a driving current for driving the light-emitting device D1 to emit light, and the first transistor T1 and a corresponding light-emitting device D1 are connected in series between the voltage end OVDD and the second voltage end OVSS. Optionally, the anode of the light-emitting device D1 is connected to the first voltage end OVDD, the drain electrode of the first transistor T1 is connected to the cathode of the light-emitting device D1, and the source electrode of the first transistor T1 is electrically connected to the second voltage end OVSS, as shown in FIG. 4A to FIG. 4C. Optionally, the cathode of the light-emitting device D1 is connected to the second voltage end OVSS, the source electrode of the first transistor T1 is electrically connected to the anode of the light-emitting device D1, and the drain electrode of the first transistor T1 is connected to the first voltage end OVDD, as shown in FIG. 4D to FIG. 4F.

Please continue to refer to FIG. 4A to FIG. 4F. The reset compensation module includes a second transistor T2, the first capacitor C1, and the second capacitor C2. The second transistor T2 is configured to load a first reset voltage signal to the gate electrode of the first transistor T1 according to the reset control signal. The first capacitor C1 is adopted to store a threshold voltage of the first transistor T1, and the second capacitor C2 is adopted to couple the threshold voltage to the first capacitor C1.

Specifically, the gate electrode of the second transistor T2 is connected to the reset control signal line EM2. One of the source electrode or the drain electrode of the second transistor T2 is connected to the first reset voltage end VI1, another of the source electrode or the drain electrode of the second transistor T2 is connected to the gate electrode of the first transistor T1. The first capacitor C1 is connected in series between the gate electrode of the first transistor T1 and the source electrode of the first transistor T1, and the second capacitor C2 is connected in series between the source electrode of the first transistor T1 and the second voltage end OVSS, the second capacitor C2 is connected in series between the first capacitor C1 and the second voltage end OVSS, so that the second capacitor C2 is connected in series between the first capacitor C1 and the second voltage end OVSS.

Wherein, the reset control signal line EM2 is configured to provide the reset control signal to the second transistor T2. The first reset voltage end VI1 is configured to provide the first reset voltage signal to the second transistor T2. The voltage value of the first reset voltage signal is greater than the threshold voltage of the first transistor T1.

Please continue to refer to FIG. 4A to FIG. 4F, the data writing module includes a third transistor T3, and the third transistor T3 is adopted to load a data signal to the gate electrode of the first transistor T1 according to a data writing control signal. Specifically, the gate electrode of the third transistor T3 is connected to the data writing control signal line WR. One of a source electrode or a drain electrode of the third transistor T3 is connected to the data voltage end Data, and another of the source electrode or the drain electrode of the third transistor T3 is connected to the gate electrode of the first transistor T1. Wherein, the data writing control signal line WR is configured to provide the data writing control signal to the third transistor T3, and the data voltage end Data is configured to provide the data signal to the third transistor T3.

Further, please refer to FIG. 4B to FIG. 4C and FIG. 4E to FIG. 4F, the reset compensation module further includes a fifth transistor T5 and the third capacitor C3. The third capacitor C3 is configured to couple the data signal to the gate electrode of the first transistor T1. The fifth transistor T5 is configured to reset voltages of two ends of the third capacitor C3 with the second transistor T2 according to the reset control signal.

Specifically, the third capacitor C3 is connected in series between the another of the source electrode or the drain electrode of the third transistor T3 and the gate electrode of the first transistor T1. A gate electrode of the fifth transistor T5 is connected to the reset control signal line EM2. One of a source electrode or a drain electrode of the fifth transistor T5 is connected to the second reset voltage end VI2, and another of the source electrode or the drain electrode of the fifth transistor T5 is connected to the one of the source electrode or the drain electrode of the third transistor T3 i.e. connected to the third capacitor C3. The reset control signal line EM2 is configured to provide the reset control signal to the second transistor T2 and the fifth transistor T5, and the second reset voltage end VI2 is configured provide a second reset voltage signal to the fifth transistor T5.

Please continue to refer to FIG. 4A to FIG. 4F. The light-emitting control module includes a fourth transistor T4, and the fourth transistor T4 is configured to control the threshold voltage to be coupled to the first capacitor C1 by the second capacitor C2 according to the first light-emitting control signal. Specifically, a gate electrode of the fourth transistor T4 is connected to the first light-emitting control signal line EM1. One of a source electrode or a drain electrode of the fourth transistor T4 is connected to the first transistor T1, and another of the source electrode or the drain electrode of the fourth transistor T4 is connected to the second voltage end OVSS, as shown in FIG. 4A to FIG. 4C. Wherein, the first light-emitting control signal line EM1 is configured to provide the first light-emitting control signal to the fourth transistor T4.

Further, please continue to refer to FIG. 4C and FIG. 4F, the light-emitting control module further includes a sixth transistor T6, and the sixth transistor T6 is configured to disconnect an electrical connection between the first voltage end OVDD and the first transistor T1 according to the second light-emitting control signal. Specifically, a gate electrode of the sixth transistor T6 is connected to the second light-emitting control signal line EM3. One of a source electrode or a drain electrode of the sixth transistor T6 is connected to the drain electrode of the first transistor T1, and another of the source electrode or the drain electrode of the sixth transistor T6 is connected to the cathode electrode of the light-emitting device D1, as shown in FIG. 4C. Or, another of the source electrode or the drain electrode of the sixth transistor T6 is connected to the first voltage end OVDD, as shown in FIG. 4F. Wherein, the second light-emitting control signal line EM3 is configured to provide the second light-emitting control signal to the sixth transistor T6.

Optionally, the first transistor T1, the second transistor T2, the third transistor T3, the fourth transistor T4, the fifth transistor T5, and the sixth transistor T6 include field effect transistors. Further, the field effect transistors include thin-film transistors. Optionally, the first transistor T1, the second transistor T2, the third transistor T3, the fourth transistor T4, the fifth transistor T5, and the sixth transistor T6 include N-type transistors and P-type transistors.

An embodiment of the present disclosure further provides a display device, and the display device includes any one of the above-mentioned pixel driving circuits or any one of the above-mentioned display panels.

The display devices include fixed terminals such as television, desktop computers, mobile terminals such as mobile phones and notebook computers, wearable devices such as bracelets, virtual reality (VR) display devices, and augmented reality (AR) display devices.

The description of the above embodiments is only configured to help understand the method and core idea of the disclosure. At the same time, according to the idea of this disclosure, there will be changes in the specific implementation and the scope of disclosure for those skilled in the art. As mentioned above, the content of the specification should not be construed as a limitation to the disclosure.

What is claimed is:

1. A pixel driving circuit, comprising:

a light-emitting device;

a driving transistor, disposed in series with the light-emitting device between a first voltage end and a second voltage end;

a first reset transistor, connected between a first reset voltage end and a gate electrode of the driving transistor;

a first capacitor, wherein a first end of the first capacitor is connected to the gate electrode of the driving transistor, and a second end of the first capacitor is connected to one of a source electrode or a drain electrode of the driving transistor;

a second capacitor, wherein a first end of the second capacitor is connected to the second end of the first capacitor, and a second end of the second capacitor is connected to the second voltage end;

a data transistor, wherein the data transistor is connected between a data voltage end and the gate electrode of the driving transistor; and a third capacitor, wherein a first end of the third capacitor is connected to the gate electrode of the driving transistor, and a second end of the third capacitor is connected to one of a source electrode or a drain electrode of the data transistor.

2. The pixel driving circuit as claimed in claim 1, further comprising:

a second reset transistor, wherein the second reset transistor is connected between a second reset voltage end and the second end of the third capacitor.

3. The pixel driving circuit as claimed in claim 1, further comprising:

a first switching transistor, wherein the first switching transistor is connected between the second voltage end and one of the source electrode or the drain electrode of the driving transistor connected to the second end of the first capacitor.

4. The pixel driving circuit as claimed in claim 3, further comprising:

a second switching transistor, wherein the second switching transistor is connected between another of the source electrode or the drain electrode of the driving transistor and the first voltage end.

5. The pixel driving circuit as claimed in claim 1, wherein the light-emitting device comprises an organic light-emitting diode, a sub-millimeter light-emitting diode, or a micro light-emitting diode.

6. The pixel driving circuit as claimed in claim 5, wherein the organic light-emitting diode comprises a positive organic light-emitting diode, and the positive organic light-emitting diode is connected in series between the second voltage end and the source electrode of the driving transistor.

7. The pixel driving circuit as claimed in claim 5, wherein the organic light-emitting diode comprises an inverted organic light-emitting diode, and the inverted organic light-emitting diode is connected in series between the first voltage end and the drain electrode of the driving transistor.

8. The pixel driving circuit as claimed in claim 1, wherein a voltage value of a first reset voltage signal loaded to the first reset voltage end is greater than a threshold voltage of the driving transistor.

9. A display panel, comprising a plurality of light-emitting devices and a plurality of pixel driving circuits;

wherein each of the plurality of pixel driving circuits is configured to drive a corresponding one of the plurality of light-emitting devices to emit light;

wherein each of the plurality of pixel driving circuits comprises a first transistor, a reset compensation module and a data writing module; the reset compensation module comprises a second transistor, a first capacitor, a second capacitor, and a third capacitor; and the data writing module comprises a third transistor, and the third transistor is configured to load a data signal to a gate electrode of the first transistor according to a data writing control signal;

wherein the second transistor is configured to load a first reset voltage signal to a gate electrode of a driving transistor according to a reset control signal, the first capacitor is configured to store a threshold voltage of the driving transistor, the second capacitor is configured to couple the threshold voltage to the first capacitor; and the third capacitor is configured to couple the data signal to the gate electrode of the first transistor.

10. The display panel as claimed in claim 9, wherein each of the plurality of pixel driving circuits further comprises:

a light-emitting control module, wherein the light-emitting control module comprises a fourth transistor, and the fourth transistor is configured to couple the threshold voltage to the first capacitor through the second capacitor according to a first light-emitting control signal.

11. The display panel as claimed in claim 9, wherein the reset compensation module further comprises:

a fifth transistor, configured to reset voltages of two ends of the third capacitor with the second transistor according to the reset control signal.

12. The display panel as claimed in claim 11, wherein the light-emitting control module further comprises a sixth transistor, and the sixth transistor is configured to disconnect an electrical connection between a first voltage end and the first transistor according to a second light-emitting control signal.

13. The display panel as claimed in claim 12, wherein the display panel further comprises a light-transmitting display area, and the plurality of light-emitting devices disposed on the light-transmitting display area are connected to one of the plurality of pixel driving circuits.

14. The display panel as claimed in claim 9, wherein each of the plurality of organic light-emitting diodes comprises an inverted organic light-emitting diode and a positive organic light-emitting diode.

15. A display device, comprising a display panel, and the display panel comprises a plurality of light-emitting devices and a plurality of pixel driving circuits;

wherein each of the plurality of pixel driving circuits is configured to drive a corresponding one of the plurality of light-emitting devices to emit light, and each of the plurality of pixel driving circuits comprises:

a driving transistor, disposed in series with the light-emitting device between a first voltage end and a second voltage end;

a first reset transistor, connected between a first reset voltage end and a gate electrode of the driving transistor;

a first capacitor, wherein a first end of the first capacitor is connected to the gate electrode of the driving transistor, and a second end of the first capacitor is connected to one of a source electrode or a drain electrode of the driving transistor;

a second capacitor, wherein a first end of the second capacitor is connected to the second end of the first capacitor, and a second end of the second capacitor is connected to the second voltage end;

a data transistor, wherein the data transistor is connected between a data voltage end and the gate electrode of the driving transistor; and a third capacitor, wherein a first end of the third capacitor is connected to the gate electrode of the driving transistor, and a second end of the third capacitor is connected to one of a source electrode or a drain electrode of the data transistor.

16. The display device as claimed in claim 15, wherein each of the plurality of pixel driving circuits further comprises:

a first switching transistor, wherein the first switching transistor is connected between the second voltage end and one of the source electrode or the drain electrode of the driving transistor connected to the second end of the first capacitor.

17. The display device as claimed in claim 15, wherein each of the plurality of pixel driving circuits further comprises:

a second reset transistor, wherein the second reset transistor is connected between a second reset voltage end and the second end of the third capacitor.

18. The display device as claimed in claim 17, wherein each of the plurality of pixel driving circuits further comprises:

a second switching transistor, wherein the second switching transistor is connected between another of the source electrode or the drain electrode of the driving transistor and the first voltage end.

* * * * *